United States Patent
Tatsuoka et al.

(10) Patent No.: US 7,729,896 B2
(45) Date of Patent: Jun. 1, 2010

(54) CYCLE SIMULATION METHOD, CYCLE SIMULATOR, AND COMPUTER PRODUCT

(75) Inventors: Masato Tatsuoka, Kawasaki (JP); Atsushi Ike, Kawasaki (JP)

(73) Assignee: Fujitsu Microelectronics Limited, Yokohama (JP)

( * ) Notice: Subject to any disclaimer, the term of this patent is extended or adjusted under 35 U.S.C. 154(b) by 784 days.

(21) Appl. No.: 11/439,124

(22) Filed: May 24, 2006

(65) Prior Publication Data

US 2007/0233451 A1 Oct. 4, 2007

(30) Foreign Application Priority Data

Feb. 6, 2006 (JP) ............................... 2006-028227

(51) Int. Cl.
G06F 17/50 (2006.01)
(52) U.S. Cl. ....................................................... 703/14
(58) Field of Classification Search .................... 703/14
See application file for complete search history.

(56) References Cited

U.S. PATENT DOCUMENTS

| | | | | |
|---|---|---|---|---|
| 4,345,309 A | * | 8/1982 | Arulpragasam et al. | 711/140 |
| 5,623,628 A | * | 4/1997 | Brayton et al. | 711/141 |
| 6,718,294 B1 | * | 4/2004 | Bortfeld | 703/20 |
| 7,143,401 B2 | * | 11/2006 | Babaian et al. | 717/149 |
| 7,496,490 B2 | * | 2/2009 | Tatsuoka et al. | 703/14 |
| 2006/0129765 A1 | * | 6/2006 | Rose et al. | 711/133 |
| 2006/0195825 A1 | * | 8/2006 | Vanspauwen et al. | 717/135 |
| 2007/0078640 A1 | * | 4/2007 | Gabor et al. | 703/21 |

FOREIGN PATENT DOCUMENTS

| | | |
|---|---|---|
| JP | 4-352262 | 12/1992 |
| JP | 5-35534 | 2/1993 |
| JP | 2001-256267 | 9/2001 |

OTHER PUBLICATIONS

Frank et al, "The KSR1: Bridging the Gap Between Shared Memory and MPP's", Proceedings Compcon, CS press, pp. 285-294, 1993.*
Matsuo et al, "Shaman: A Distributed Simulator for Shared Memory Multiprocessors", Proceedings of the 10th IEEE International Symposium on Modeling, Analysis and Simulation of Computer and Telecommunications Systems, pp. 347-355, 2002.*
Reinhardt et al, "The Wisconsin Wind Tunnel: Virtual Prototyping of Parallel Computers", ACM Sigmetrics-May 1993.*
Barriga et al, "A Model for Parallel Simulation of Distributed Shared Memory", Proceedings of MASCOTS '96, San Jose, CA, Feb. 1-Feb. 4, 1996.*

* cited by examiner

*Primary Examiner*—Paul L Rodriguez
*Assistant Examiner*—Mary C Jacob
(74) *Attorney, Agent, or Firm*—Arent Fox LLP

(57) ABSTRACT

It is determined whether an i-th instruction is for a memory access. If the i-th instruction is the memory access, it is determined whether an address to access according to the i-th instruction coincides with an address that has been accessed by a first execution block. If the addresses coincide with each other, it is determined whether a cycle of a second execution block currently executing precedes that of the first execution block. If the cycle of the second execution block precedes that of the first executing block, a memory model is accessed. A necessary number of cycles for execution of a j-th instruction is added to the current number of cycles, and the address, a cycle, data, and a data size at the time of the current access (before re-writing) are written in a delay table.

5 Claims, 12 Drawing Sheets

FIG.7

DELAY TABLE

| REAL CYCLE | ADDRESS | DATA | DATA SIZE |
|---|---|---|---|
| ⋮ | ⋮ | ⋮ | ⋮ |
| 120 | RegA | D1 | S1 |
| ⋮ | ⋮ | ⋮ | ⋮ |

FIG.8

MEMORY MODEL

| REAL CYCLE | ADDRESS | DATA | DATA SIZE |
|---|---|---|---|
| ⋮ | ⋮ | ⋮ | ⋮ |
| 120 | RegA | D2 | S2 |
| ⋮ | ⋮ | ⋮ | ⋮ |

FIG.10
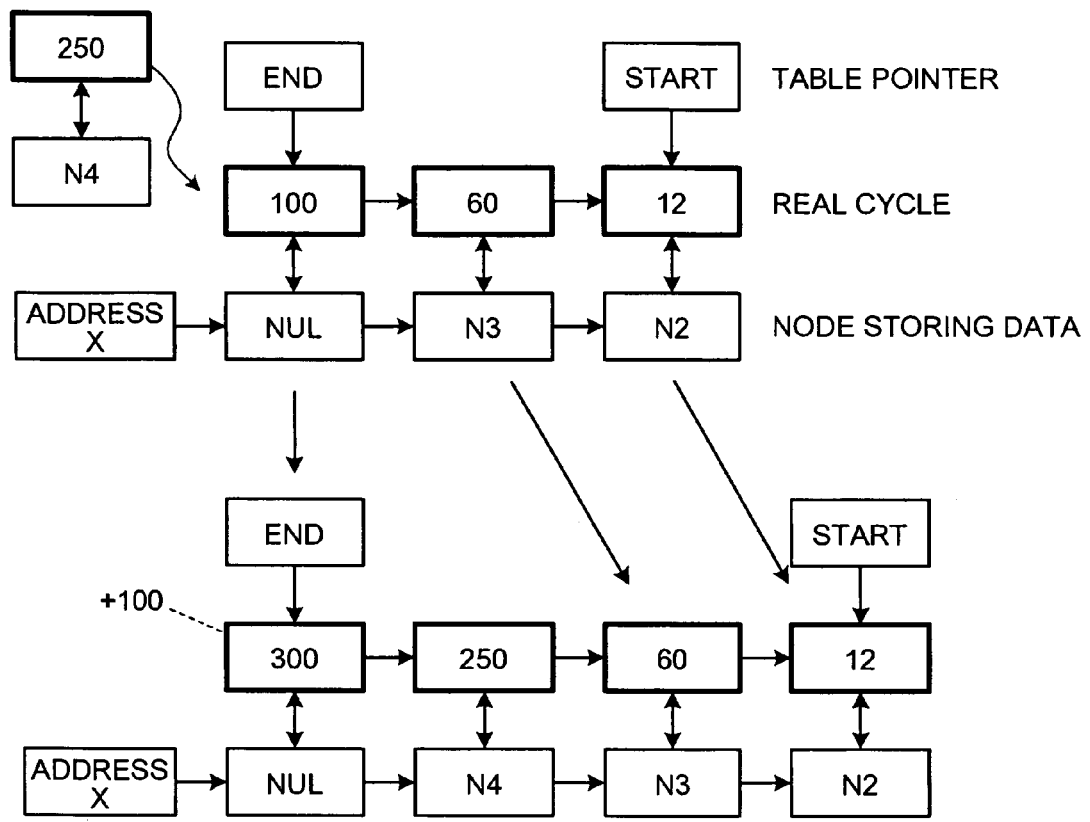
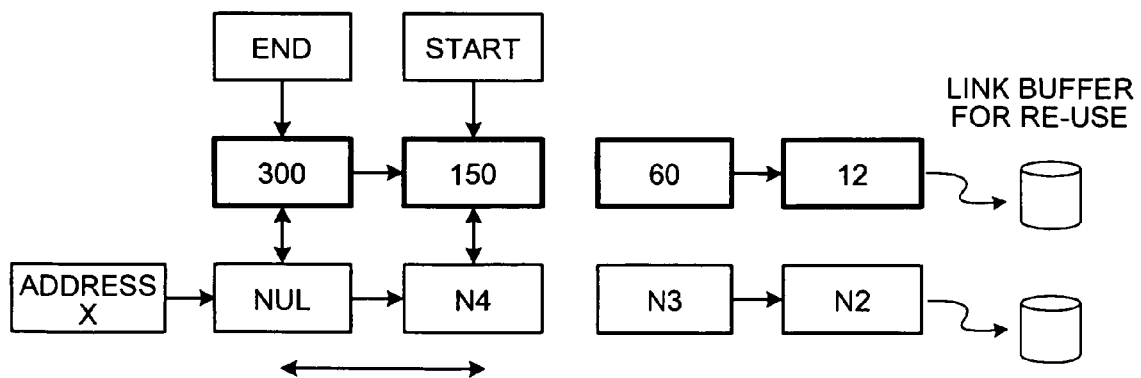

| CYCLE RANGE | HW EXECUTION FLAG |
|---|---|
| 0-9 | 0 |
| 10-19 | 0 |
| 20-29 | 1 |
| ⋮ | ⋮ |
| 30-39 | 0 |

CYCLE SIMULATION METHOD, CYCLE SIMULATOR, AND COMPUTER PRODUCT

CROSS-REFERENCE TO RELATED APPLICATIONS

This application is based upon and claims the benefit of priority from the prior Japanese Patent Application No. 2006-028227, filed on Feb. 6, 2006, the entire contents of which are incorporated herein by reference.

BACKGROUND OF THE INVENTION

1. Field of the Invention

The present invention relates to a technology for cycle simulation for a large scale integration (LSI).

2. Description of the Related Art

In recent years, as well as a general-purpose central processing unit (CPU) in personal computers, an embedded type CPU has been shifting to multi-core type. To shorten developing time for a system LSI that is getting more and more complicated, it is important to conduct coordinated designing of hardware and software from an early stage of designing. Since simulation speed in the existing simulators is not sufficiently high, development of a high-speed software/hardware coordinated simulator has been demanded.

FIG. 1 is a schematic of an LSI model 1200 to be simulated. As shown in FIG. 1, the LSI model 1200 includes an execution block consisting of processor core models PE# (# represents a number), a peripheral block model PB. A cycle model is obtained by executing the LSI model shown in FIG. 1 by an instruction set simulator (ISS).

FIG. 2 is a schematic of a cycle model when the LSI model shown in FIG. 1 is executed by the ISS. PE# shown in FIG. 2 indicates an instruction execution time (the number of cycles) of the processor core model PE#. Similarly, PB indicates an instruction execution time (the number of cycles) of the peripheral block model PB.

C# shown in FIG. 2 represents the number of necessary cycles in a corresponding instruction execution time. For example, the number of cycles C0 represents the number of necessary cycles when a processor core model PE0 is executed. In the conventional cycle model shown in FIG. 2, the cycle is calculated by adding cycles, and by acquiring difference in a cycle term. Such conventional technologies are disclosed in, for example, Japanese Patent Application Laid-Open Publication No. H5-35534, Japanese Patent Application Laid-Open Publication No. H4-352262, and Japanese Patent Application Laid-Open Publication No. 2001-256267.

However, in the conventional cycle model shown in FIG. 2, instructions are executed serially. Therefore, the simulation time increases as the instruction execution increases. On the other hand, when each execution block is executed in parallel to reduce the simulation time, data are not correctly reflected to a memory model or a register model. Therefore, incorrect simulation is executed.

FIG. 3 is a schematic for illustrating parallel simulation. The simulation will be described using only the processor core models PE0 and PE1 to simplify the description. The processor core model PE0 is first executed as an execution block. The number of necessary cycles C0 in this case is assumed to be 100. At this point, data D1 is written at an address RegA of a memory model.

After the execution of the processor core model PE0 is completed, the processor core model PE1 is executed as shown in a diagram (B) in FIG. 3. The number of necessary cycles C1 in this case is assumed to be "150". The processor core model PE1 writes data D2 during the execution at the address RegA of the memory model that stores the data D1 in a 120th cycle.

After the execution of the processor core model PE0 is completed, the processor core model PE1 is again selected, and as shown in a diagram (C) in FIG. 3, the processor core model PE0 is executed. In this case, the number of necessary cycles in this case is assumed to be represented as C3. It is assumed that, during the term of C3, the data written at the address RegA of the memory address is read in, for example, the 110th cycle.

Although the processor core model PE0 is supposed to read the data D1 written at the address RegA in the memory model, the processor core model PE0 reads the data D2 written by the processor core model PE1 that has been executed earlier. Thus, incorrect simulation is executed.

SUMMARY OF THE INVENTION

It is an object of the present invention to at least solve the above problems in the conventional technologies.

A method according to one aspect of the present invention is of simulating a plurality of execution blocks in a large scale integration model in parallel by synchronizing cycles of the execution blocks. The method includes detecting, when a first instruction is executed by a first block that is selected from among the execution blocks, number of cycles at a time of completion of the first instruction; judging whether a second instruction currently being executed by a second block that is selected subsequent to the first block is an instruction to access a memory model; determining, based on a result of judgment at the judging, whether a first address at which the first block has accessed the memory model coincides with a second address of the memory model, the second address included in the second instruction for the second block to access; comparing, based on a result of determination at the determining, current number of cycles of the second block and the number of cycles detected at the detecting; and storing, based on a result of comparison at the comparing, the second address and data that has been stored at the second address, in a storage area different from the memory model.

A computer-readable recording medium according to another aspect of the present invention stores therein a computer program for realizing a method according to the above aspect.

A cycle simulator according to still another aspect of the present invention is for simulating a plurality of execution blocks in a large scale integration model in parallel by synchronizing cycles of the execution blocks. The cycle simulator includes a detecting unit configured to detect, when a first instruction is executed by a first block that is selected from among the execution blocks, number of cycles at a time of completion of the first instruction; a judging unit configured to judge whether a second instruction currently being executed by a second block that is selected subsequent to the first block is an instruction to access a memory model; a determining unit configured to determine, based on a result of judgment by the judging unit, whether a first address at which the first block has accessed the memory model coincides with a second address of the memory model, the second address included in the second instruction for the second block to access; a comparing unit configured to compare, based on a result of determination at the determining, current number of cycles of the second block and the number of cycles detected by the detecting unit; and a storing unit configured to store, based on a result of comparison at the comparing, the second address and data that has been stored at the second address, in a storage area different from the memory model.

According to the present invention, reduction of the simulation time and higher-precision simulation can be facilitated.

The other objects, features, and advantages of the present invention are specifically set forth in or will become apparent from the following detailed description of the invention when read in conjunction with the accompanying drawings.

BRIEF DESCRIPTION OF THE DRAWINGS

FIG. 7 is a schematic of a delay table according to the embodiment;

FIG. 8 is a schematic of a memory model;

FIG. 10 is a schematic for illustrating a concept of the cycle management table;

DETAILED DESCRIPTION OF THE PREFERRED EMBODIMENTS

Figure 3:
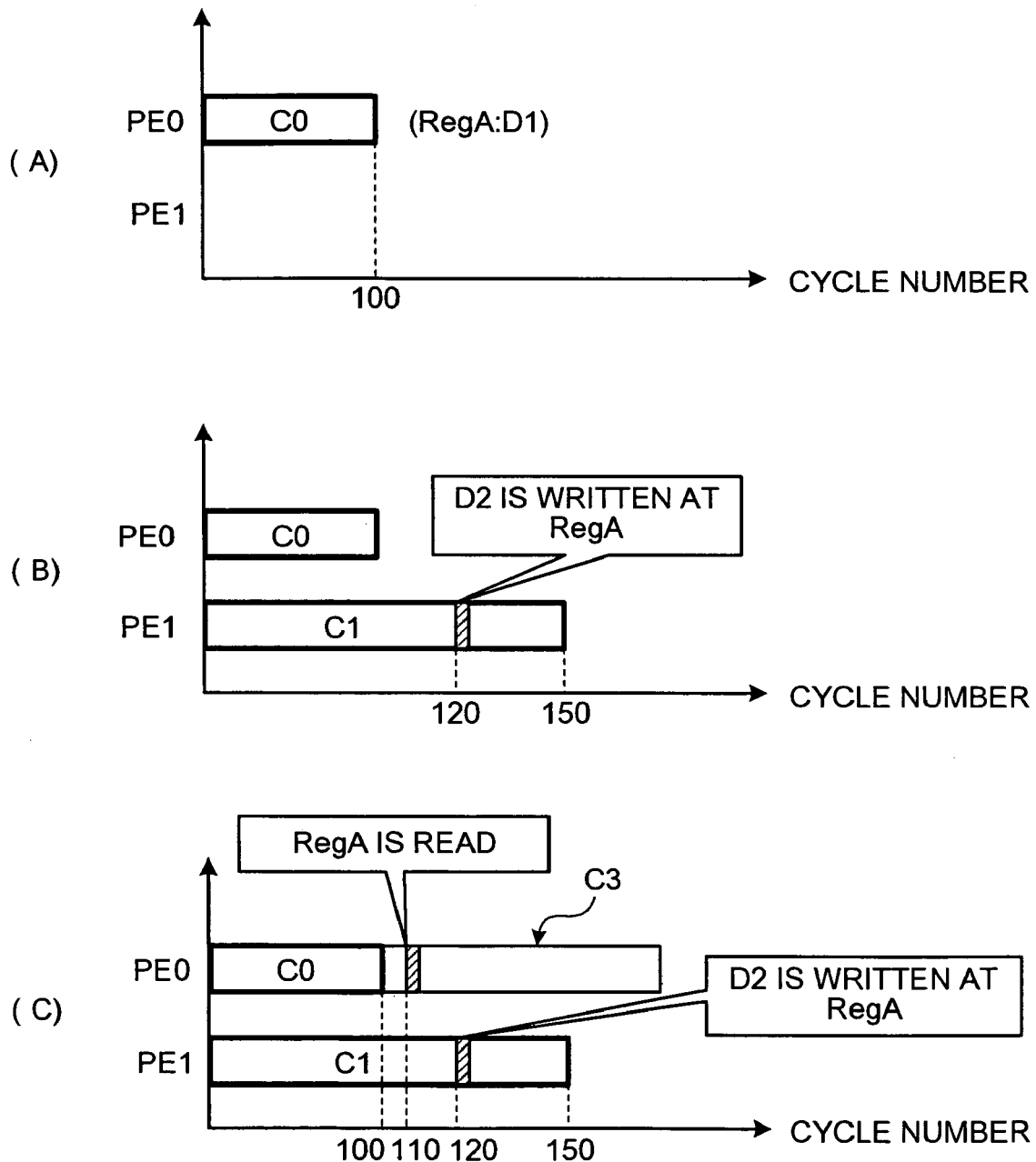
FIG. 3 is a schematic for illustrating parallel simulation.

Exemplary embodiments according to the present invention will be described in detail below with reference to the accompanying drawings. As shown in FIG. 3, in the embodiments, a cycle simulation is performed by executing each of the execution blocks while sequentially selecting each block, by synchronizing the cycles thereof, and by executing the blocks in parallel.

Figure 4:
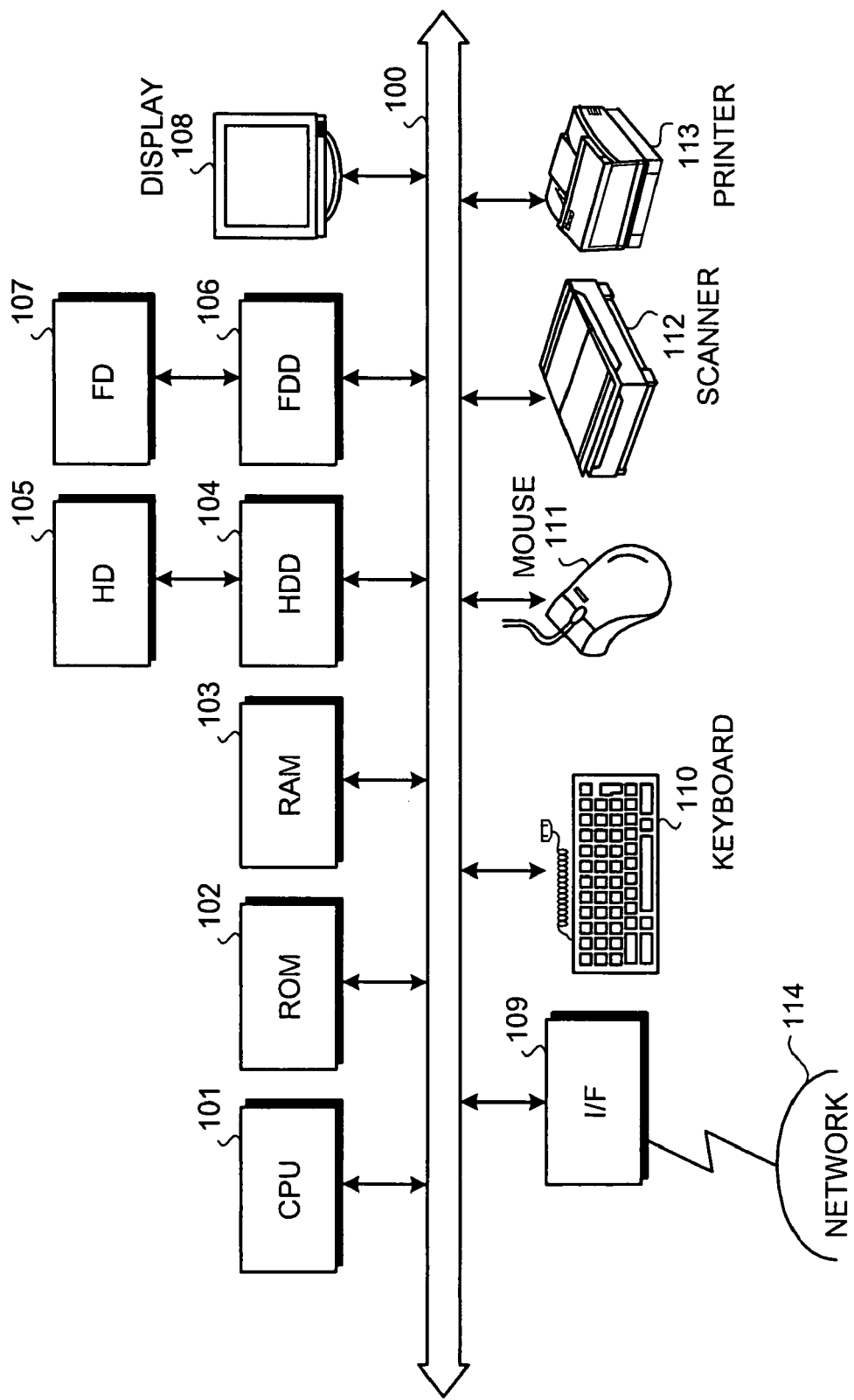
FIG. 4 is a schematic of a cycle simulator according to an embodiment of the present invention.

FIG. 4 is a schematic of a cycle simulator according to the embodiment of the present invention.

As shown in FIG. 4, the cycle simulator includes a central processing unit (CPU) 101, a read-only memory (ROM) 102, a random-access memory (RAM) 103, a hard disk drive (HDD) 104, a hard disk (HD) 105, a flexible disk drive (FDD) 106, an flexible disk (FD) 107 as an example of a removable recording medium, a display 108, an interface (I/F) 109, a keyboard 110, a mouse 111, a scanner 112, and a printer 113. Each component is connected by a bus 100 with each other.

The CPU 101 administers the control of the entire cycle simulator. The ROM 102 stores programs such as a boot program. The RAM 103 is used as a work area of the CPU 101. The HDD 104 controls reading/writing of data from/to the HD 105 according to the control of the CPU 101. The HD 105 stores data written according to the control of the HDD 104.

The FDD 106 controls reading/writing of data from/to the FD 107 according to the control of the CPU 101. The FD 107 stores the data written by the control of the FDD 106, causes the cycle simulator to read the data stored in the FD 107.

As a removable recording medium, besides the FD 107, a compact-disc read-only memory (CD-ROM), a compact-disc recordable (CD-R), a compact-disc rewritable (CD-RW), a magneto optical (MO) disk, a digital versatile disk (DVD), and a memory card may be used. In addition to a cursor, icons, or tool boxes, the display 108 displays data such as texts, images, functional information, etc. This display 108 may employ, for example, a cathode ray tube (CRT), a thin-film transistor (TFT) liquid crystal display, a plasma display, etc.

The I/F 109 is connected to a network 114 such as the Internet, through a communication line and is connected to other apparatuses through this network 114. The I/F 109 administers the interface between the network 114 and the interior, and controls input/output of data from external apparatuses. For example, a modem, an local area network (LAN) adapter, etc., may be employed as the I/F 109.

The keyboard 110 includes keys for inputting letters, digits, various instructions, etc., and executes input of data. The keyboard 110 may be a touch-panel-type input pad or a numeric key pad, etc. The mouse 111 executes move of the cursor, selection of a region, or shift and size change of windows. The mouse 111 may be a track ball or a joy stick that similarly includes the function as a pointing device.

The scanner 112 optically reads images and captures image data into the cycle simulator. The scanner 112 may have an optical character recognition (OCR) function. The printer 113 prints image data and text data. For example, a laser printer or an ink jet printer may be employed as the printer 113.

Figure 5A:
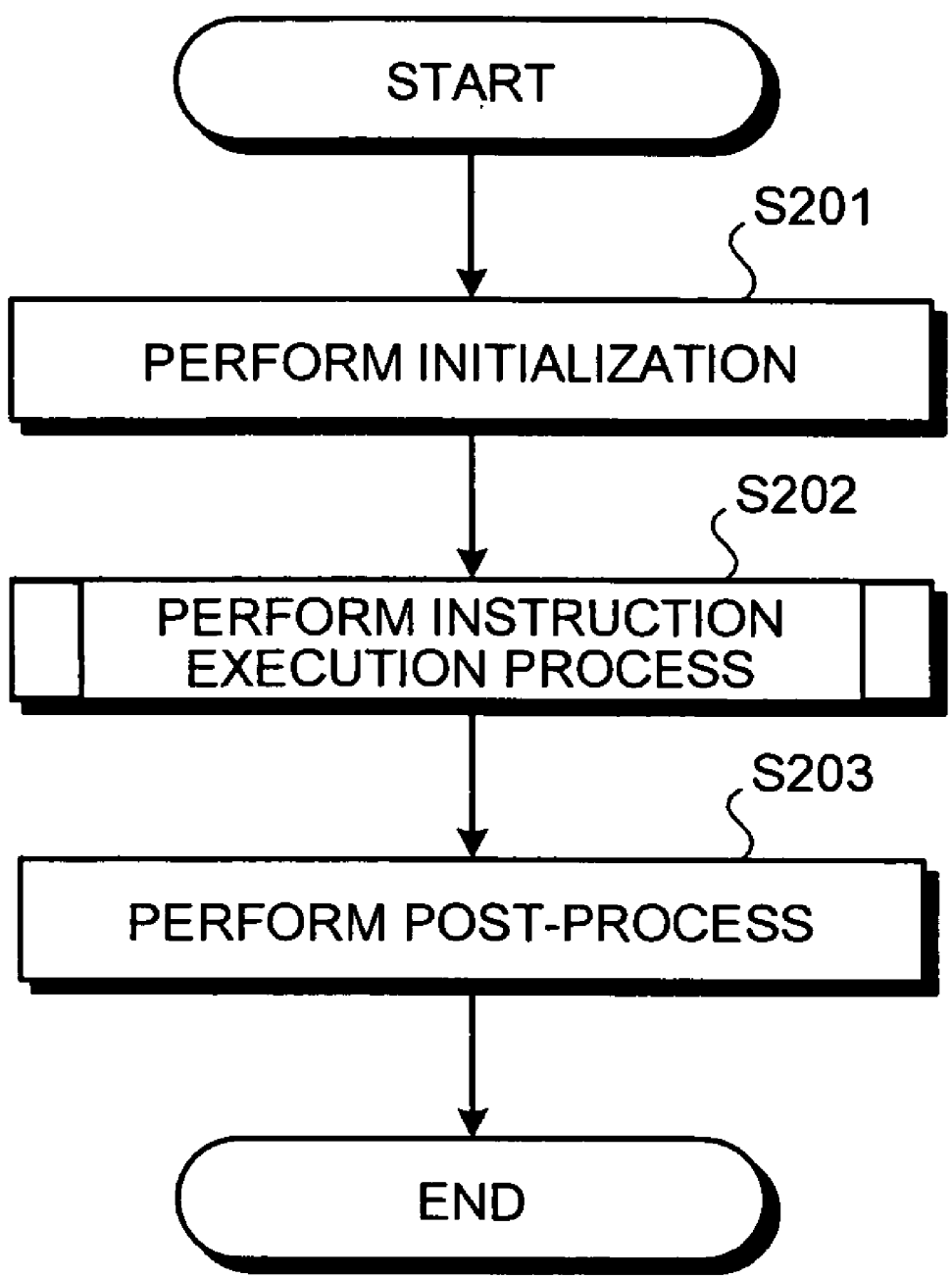
FIG. 5A is a flowchart of a cycle simulation process according to the embodiment.

FIG. 5A is a flowchart of a cycle simulation process according to the embodiment. As shown in FIG. 5A, initialization is executed first (step S201) and an instruction executing process of the cycle simulation is executed (step S202). Thereafter, a post-process is executed (step S203).

Figure 1:
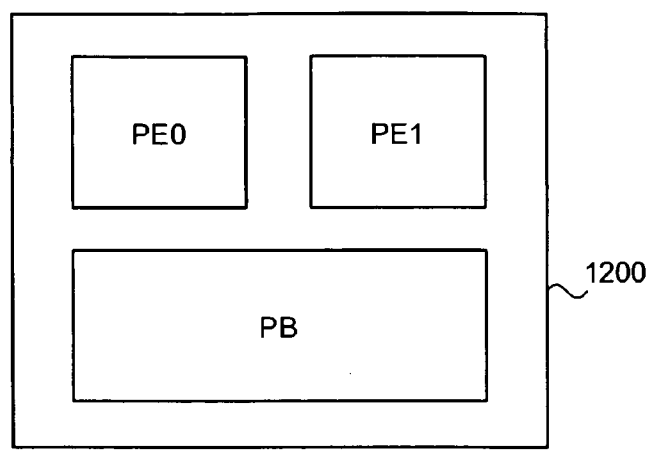
FIG. 1 is a schematic of an LSI model to be simulated.
Figure 2:
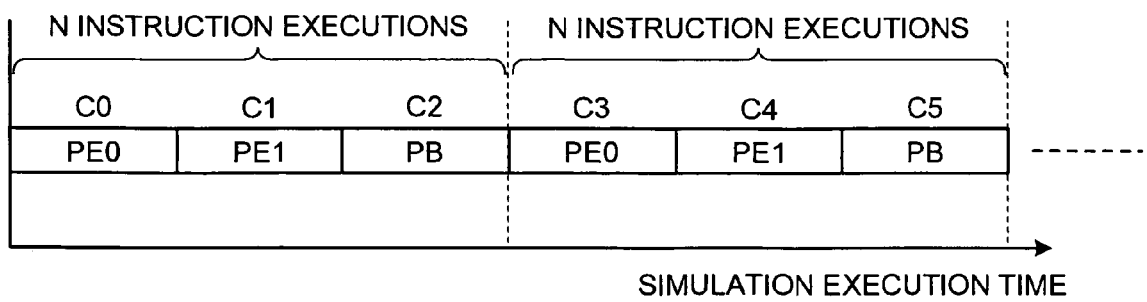
FIG. 2 is a schematic of a cycle model when the LSI model shown in FIG. 1 is executed by an ISS.
Figure 5B:
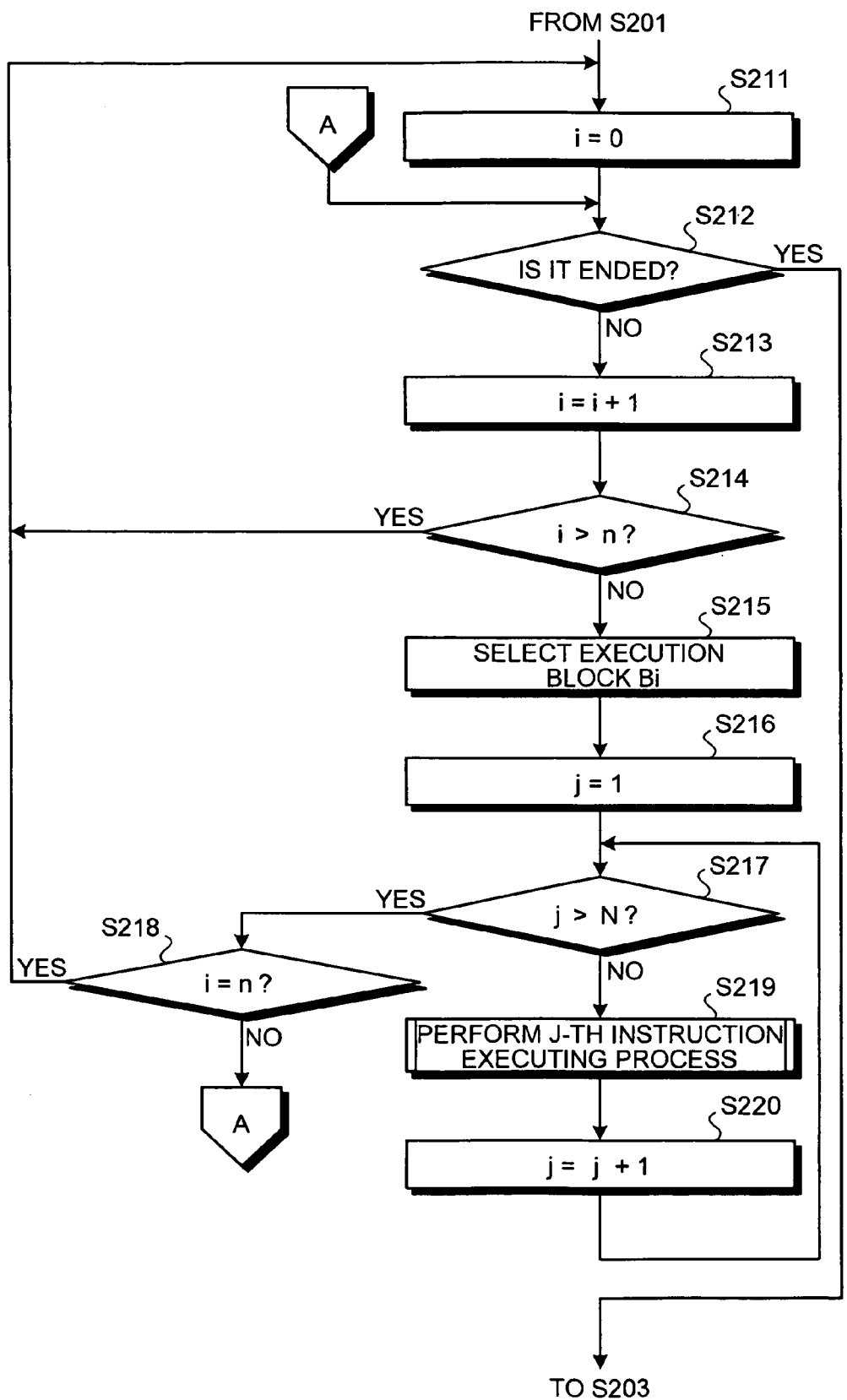
FIG. 5B is a flowchart of an instruction execution process.

FIG. 5B is a flowchart of an execution process. An i-th execution block is denoted by "Bi" where an execution block number is represented by "i". For example, taking an example of the LSI model shown in FIG. 1, the processor core model PE0 corresponds to an execution block B1, the processor core model PE1 corresponds to an execution block B2, and the periphery block model corresponds to an execution block B3.

In FIG. 5B, i is set to satisfy i=0 (step S211), and whether to end the cycle simulation is judged (step S212). This judgment may be made based on an input from a user, or whether the completion of execution of all the instructions has been detected. When the cycle simulation has been completed (step S212: YES), the process proceeds to step S203 and the post-process is executed.

When it is judged that the cycle simulation is not to be ended (step S212: NO), the i is incremented (step S213), and it is judged whether i satisfies i>n, where n is the total number of the execution blocks Bi (step S214). For example, in the example shown in FIG. 1, n=3.

When i>n (step S214: YES), the process returns to step S211. Thus, the "i" can be reset to be i=0 and, by executing step S212 and step S213, the execution block B1 at the head can be selected again.

When the i is not i>n (step S214: NO), after selecting the execution block Bi (step S215), "j" is set to be j=1, where j is a serial number for the instruction execution of the selected execution block Bi (step S216).

It is determined whether j>N is satisfied, where N is the number of instruction executions of the selected execution block Bi (step S217). When j>N (step S217: YES), it is determined whether i=n (step S218). When i=n, (step S217: YES), the process returns to step S211 and the next execution block is selected (steps S211 to S215). When i≠n (step S218: NO), the process returns to step S212.

When j>N is not satisfied (step S217: NO), a j-th instruction executing process is executed (step S219). When the j-th instruction executing process ends, the j is incremented (step S220) and the process returns to step S217. As to the processing order for step S217 and step S218 described above, step S218 may be executed earlier.

Figure 6:
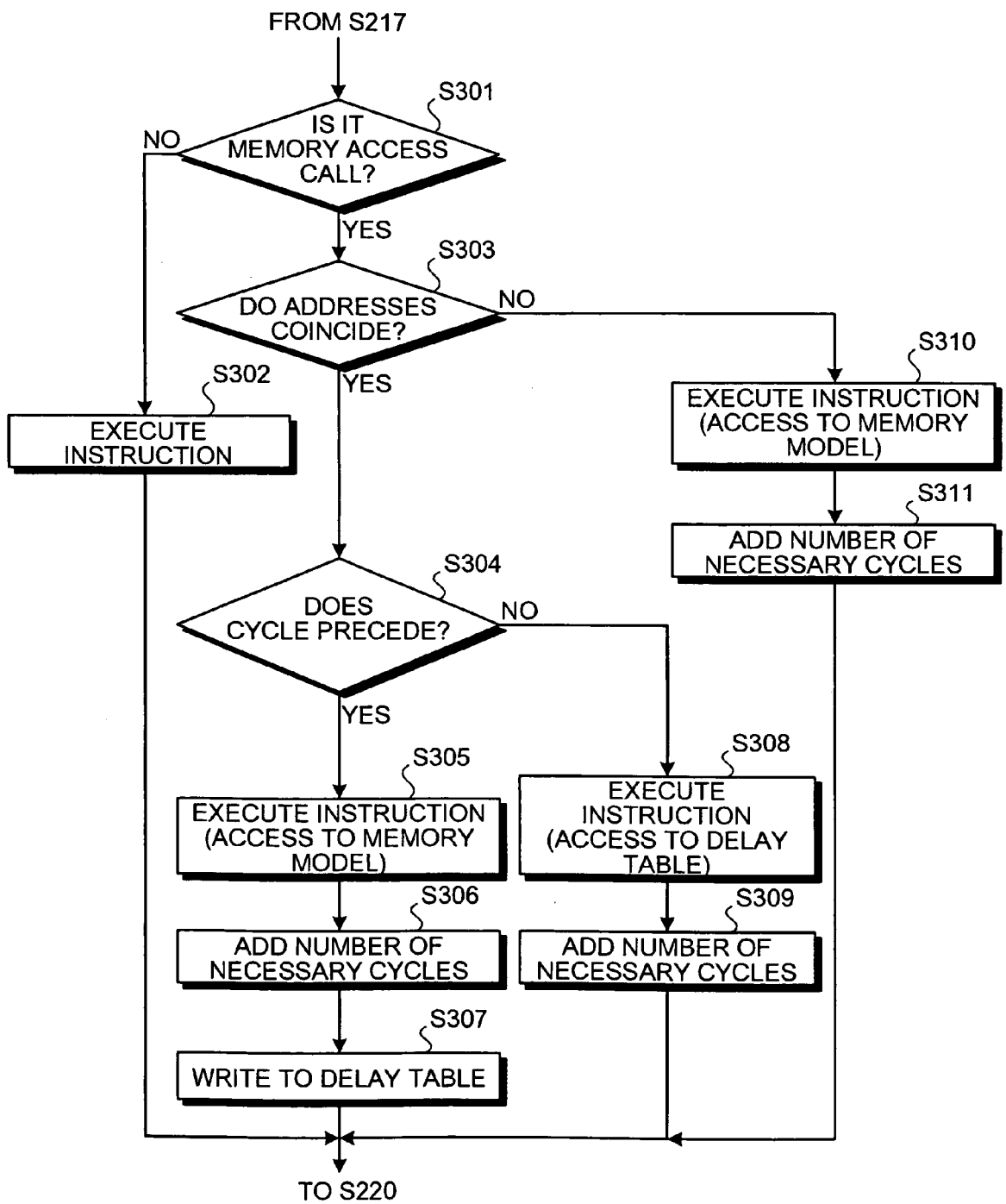
FIG. 6 is a flowchart of a j-th instruction execution process.

FIG. 6 is a flowchart of a j-th instructions execution process. As shown in FIG. 6, whether a j-th instruction is a memory access (step S301). When the j-th instruction is not a memory access call (step S301: NO), the instruction is executed (step S302) and the procedure is moved to step S220 shown in FIG. 5.

When the j-th instruction is a memory access call (step S301: YES), whether an address to be accessed coincides with an address that an execution block Bk has accessed is judged (step S303) where the execution block Bk (k<i) is an execution block that has been executed earlier than the execution block Bk that is currently being executed.

When the addresses do not coincide (step S303: NO), the instruction is executed (step S310) and the number of necessary cycles for this execution of the instruction is added (step S311), and the process proceeds to step S24-9S220. On the other hand, when the addresses coincide (step S303: YES), it is determined whether the cycle of the execution block Bk that is currently being executed precedes the execution block Bk (step S304).

For example, assuming that the execution block Bi is the processor core model PE1 and the execution block Bk is the processor core model PE0 respectively shown in the diagram (C) in FIG. 3, the current cycle in the processor core model PE1 is compared to the cycle C0 (=100) of the processor core model PE0.

When the cycle precedes the execution block Bk (step S304: YES), the memory model is accessed (step S305). For example, when this access is "write", data for the address of the memory model is re-written.

The number of necessary cycles for execution of the j-th instruction is added to the current number of cycles (step 206) and an address, a cycle, data, and the data size at the time of this access (before re-writing) are written in a delay table (step S307). The procedure is moved to step S220.

When the cycle does not precede the execution block Bk (step S304: NO), the delay table is accessed using an address of the destination to be accessed as a clue (step S308).

For example, when this access is "read", the address, the cycle, the data, and the data size at the time of this access are read from the delay table. The number of necessary cycles for execution of the j-th instruction is added to the current number of cycles (step S309) and the process proceeds to step S220.

FIG. 7 is a schematic of the delay table. As shown in FIG. 7, the delay table stores various pieces of information such as real cycles, addresses, data (or pointers), data sizes, etc., and these pieces of information are sorted in order of descending number of real cycles. FIG. 8 is a schematic of the memory model. The memory model also stores various pieces of information such as real cycles, addresses, data (or pointers), data sizes, etc.

For example, at step S304, it is assumed that the number of current cycles (120) of the execution block B2 (the processor core model PE1) precedes the cycle of the execution block B1 (the processor core model PE0).

As shown in the diagram (C) in FIG. 3, when the instruction is to write the data D1 having a data size s1 at the address RegA in a 120th cycle by the execution block B2 (the processor core model PE1), as shown at step S305, the number of cycles (120 cycles), the address RegA, the data D2, and a data size s2 after the writing are written in the memory model (see FIG. 8).

The number of cycles (120 cycles), the address RegA, the data D1, and the data size s1 before the writing are written in the delay table (see FIG. 7). Thereafter, the execution block B1 (the processor core model PE0) is selected, and the delay table not the memory model is read using the address RegA as a clue when the data retained at the address RegA is read in the 110th cycle of a cycle term C3. Thus, the data can be reflected correctly by each execution block Bi.

Figure 9:
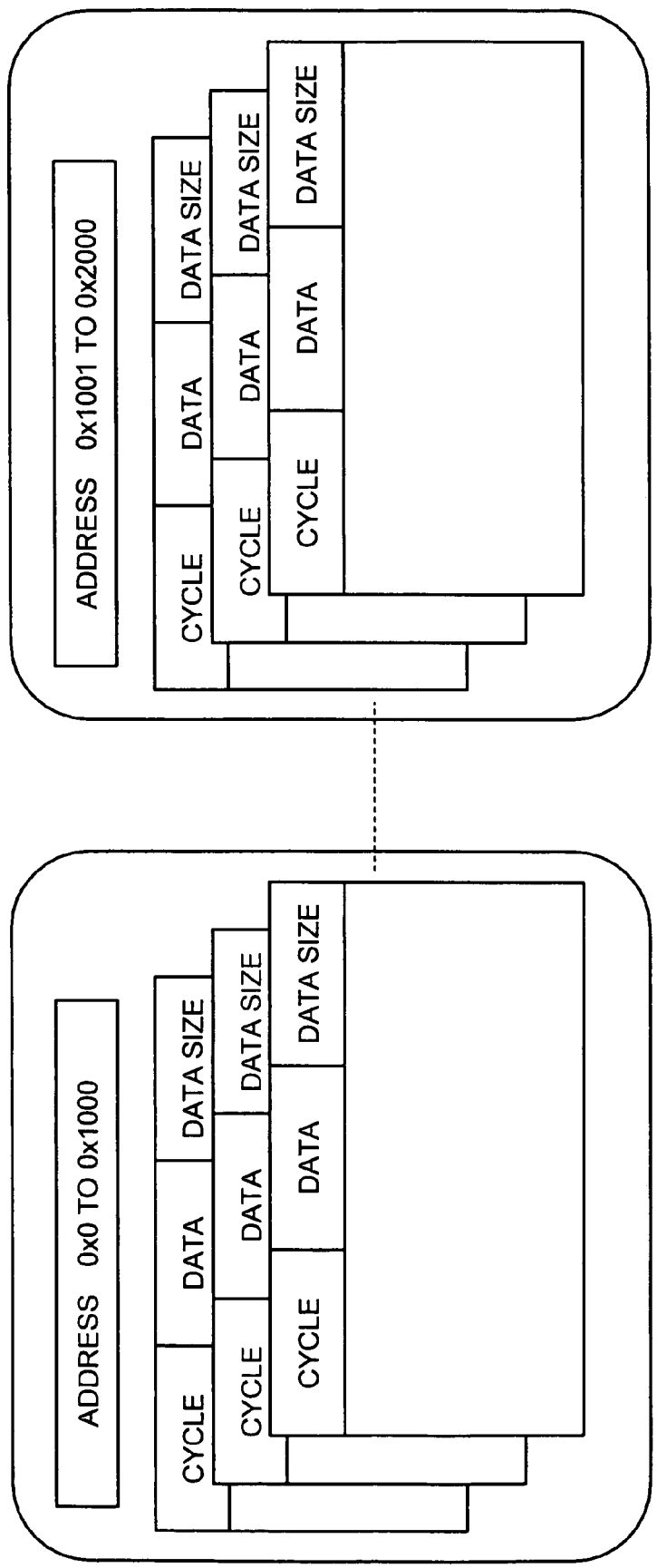
FIG. 9 is a schematic of a cycle management table.

FIG. 9 is a schematic of a cycle management table. The cycle management table has a delay table for each address having a predetermined range. The data size is specified by a memory access call. Based on the data size and the address of the delay table, a delay table belonging to which one of following groups is determined.

One memory map may be provided in the entire system to be a model, or a certain range of memory may be provided in each of the processor core models PE0, PE1 to execute the processing. If a memory can be retained being distributed as separate memories, it is not necessary to access the single memory model and the memory is retained being divided.

FIG. 10 is a schematic for illustrating a concept of the cycle management table. In the example shown in FIG. 10, only 200 cycles are retained. This cycle range can be changed. Data n4 for a 250th cycle are generated and the data n4 are inserted into the delay table. The next simulation is executed and a node for a base cycle 100 thereof is added. At this time, because only a term of 200 cycles is retained, cycles between cycles 300 and 100 are remained in the delay table and data of cycles equal to or less than those cycles are omitted.

Thus, inconsistency of data can be prevented by administering the priority for each master to access to common resources such as SoC. Because old cycle data are omitted, consumption of memories in computers can be reduced.

In a parallel operation, a plurality of pieces of hardware are operate in parallel. A register for starting hardware HW0 is as follows.

RegH[31]=0x8xxx_xxxx or RegH. v=1

A register for starting hardware HW1 is as follows.

RegW[31]=0x8xxx_xxxx or RegW. v=1

"x" indicates either "0" or "1", and "RegH. v" represents a data structure. The delay table or the memory table can be checked and operated in certain cycle units "c". When c=1, a hardware starting up flag (RegH. v and RegW. v) is checked for each cycle. To improve the performance of simulations, register check cycles are thinned by setting c to be c=10 cycles.

Figure 11:
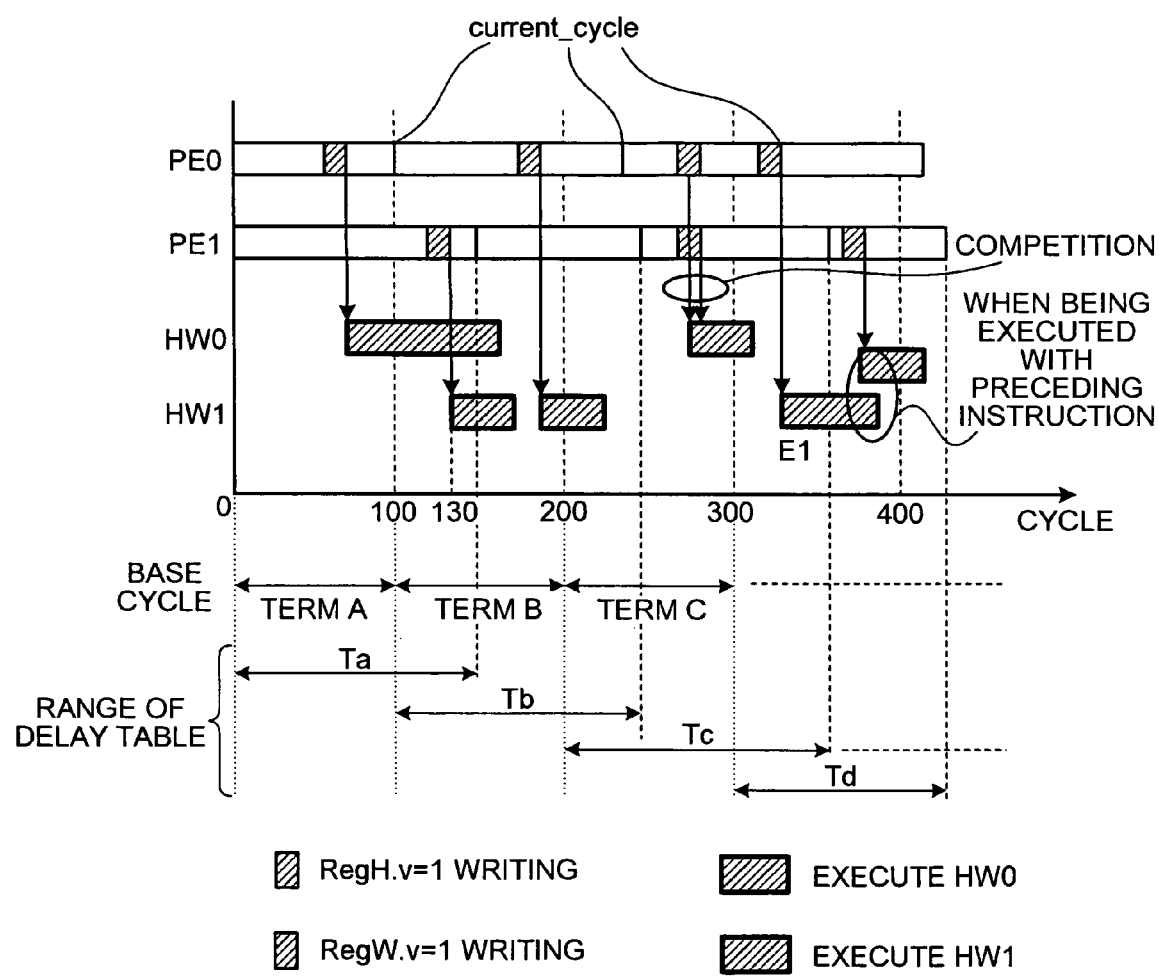
FIG. 11 is a schematic for illustrating a concept of a parallel operation.

FIG. 11 is a schematic for illustrating a concept of the parallel operation. As shown in FIG. 11, the hardware HW0 and HW1 are slaves. However, the master of the hardware HW0 and HW1 may be the same master as that of the processor core models PE#.

The delay table in this example is a delay table for the case where, for example, the hardware HW0 does not have to compete with the processor core models PE0, PE1 and the hardware HW1 for memories. The situation is the same for the hardware HW1. However, the processor models PE0 and PE1 compete with each other for memories. Therefore, the range of the delay table in this example is determined according to which of PE0 and PE1 is executed earlier.

A delay table Ta is used when a base cycle is zero. In this case, the hardware HW0 and HW1 are executed in parallel to each other. Because the base cycle has not become 100, the hardware HW1 is not executed.

A delay table Tb is a table that is used when a base cycle is 100. In this case, the hardware HW0 is executed. The hardware HW1 is checked for every c cycles and, when "130" is included in a cycle unit, is checked and executed.

A delay table Tc is used when a base cycle is 200. This case is the case where accesses are generated simultaneously from the processor core models PE0 and PE1 respectively to an execution register of the same hardware HW0.

Since it is dependent on the designed specifications in this case, which hardware executes or does not execute may be dealt according to the specification. In this example, only a sign indicating "competition" is defined and the definition is not extended to "competing execution".

A delay table Td is used when a base cycle is 300. This is the case where the hardware HW1 is executed being triggered by a request from the processor core model PE0, and when although request from the processor core model PE1 arrives, the hardware HW1 has not finished executing.

For example, if the hardware HW1 can execute only one instruction, it is further classified into cases where a following execution request is cancelled, and where the request is kept standby. In the case of the cancellation, the instruction is not executed. In the case of standby, the hardware immediately starts to execute the instruction after the preceding execution has ended.

Figure 12:
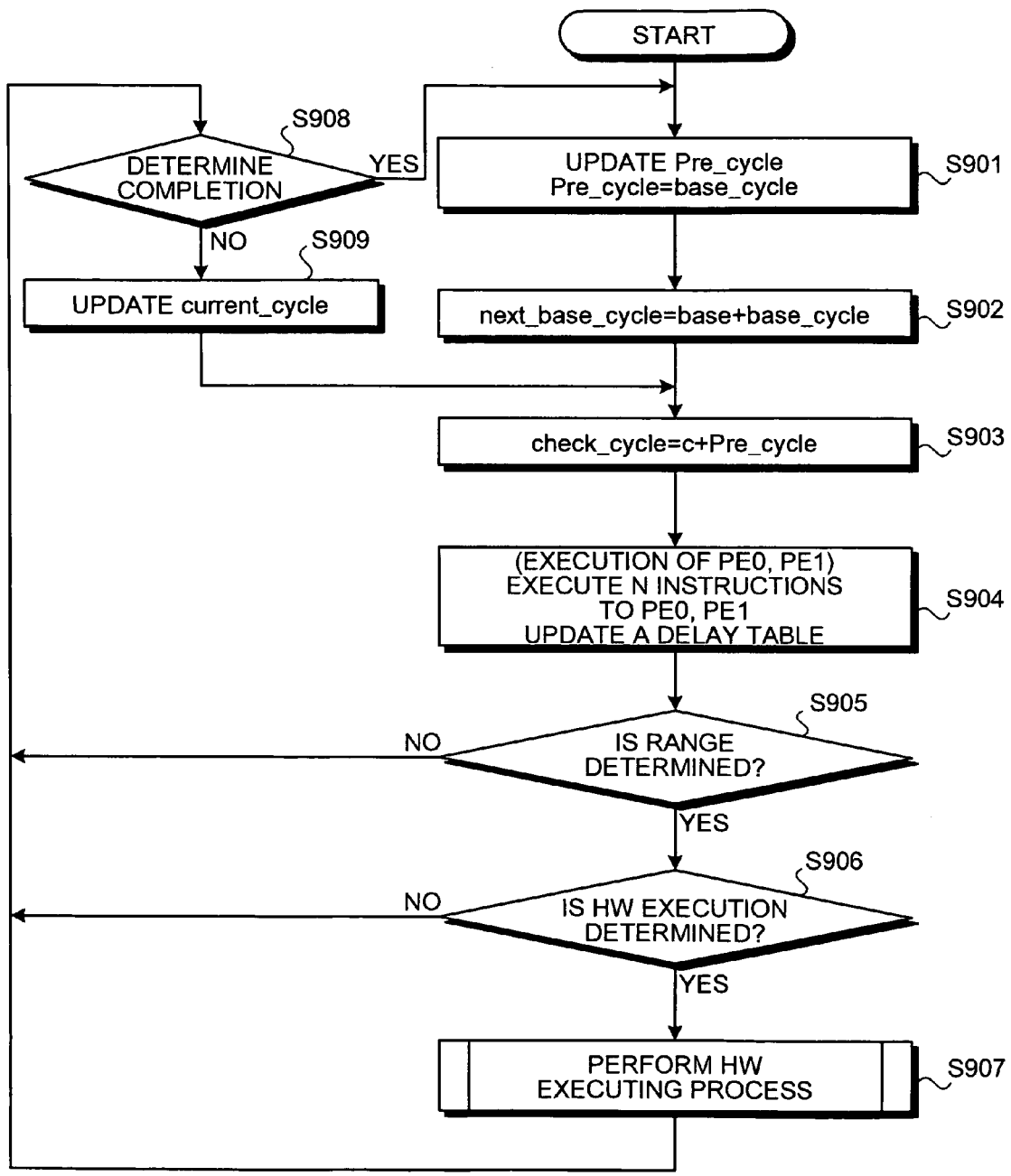
FIG. 12 is a flowchart of a parallel operation according to the embodiment.

FIG. 12 is a flowchart of a parallel operation process according to the embodiment. As shown in FIG. 12, Pre_cycle is updated first (step S901).

More specifically, at step S901, the starting cycle number during the simulation term of FIG. 11 is set. Pre_cycle is base_cycle at the start during the term of FIG. 11. Pre_cycle means a starting cycle of a delay table reference range.

Next, next_base_cycle is set (step S902). next_base_cycle is calculated by base+base_cycle. next_base_cycle is the starting cycle of the next term and, for example, is "100" for a term "A" in FIG. 11.

"base" is the interval of base cycles (N step number) and is "100" in FIG. 11. base_cycle is a starting cycle value of a delay table and is each base cycle value (0, 100, 200, 300, . . . ) in FIG. 11.

A range in which a delay table is referred to is determined (step S903). More specifically, the cycle number check_cycle at the head of the range is determined by adding the number of search cycles "c". The number of search cycles "c" means how wide the search is performed within the range when a delay table is checked. In terms of the program, this means when to search and is the cycle numbers at which the search process is thinned. check_cycle indicates a range within which search is performed from a delay table. For example, the search is performed from Pre_cycle to check_cycle.

The processor models PE0 and PE1 are executed (step S904). That is, N instructions of the processor core models are executed. At this time, the delay table is updated.

Judgment of a range is executed (step S905). In this process, whether the range of Pre_cycle to check_cycle is within the range of next_base_cycle to base_cycle is checked. When it is (step S905: Yes), the process proceeds to step S906, and when it is not, the process proceeds to step S908 because the hardware HW0 and HW1 do not execute.

At step S906, HW execution determination is performed. When it is determined to start the hardware HW0 and HW1 (step S906: YES), the process proceeds to step S907. When it is determined not to start the hardware HW0 and HW1 (step S906: NO), the process proceeds to step S908.

In execution determination, more specifically, the registers (for example, RegH. v or RegW. v) for starting the hardware HW0 and HW1, etc., are searched from delay tables within the range of Pre_cycle to check_cycle. When the registers, etc., are not present in the delay tables, the memory model is read and is checked as to whether the model is RegH. v=1 or RegW. v=1. The only one memory model exists and is to be read.

It is determined to start the hardware HW0 and HW1 when the registers (for example, RegH. v or RegW. v) have been searched, and it is determined not to start the hardware when the registers have not been searched.

Figures 13, 14:
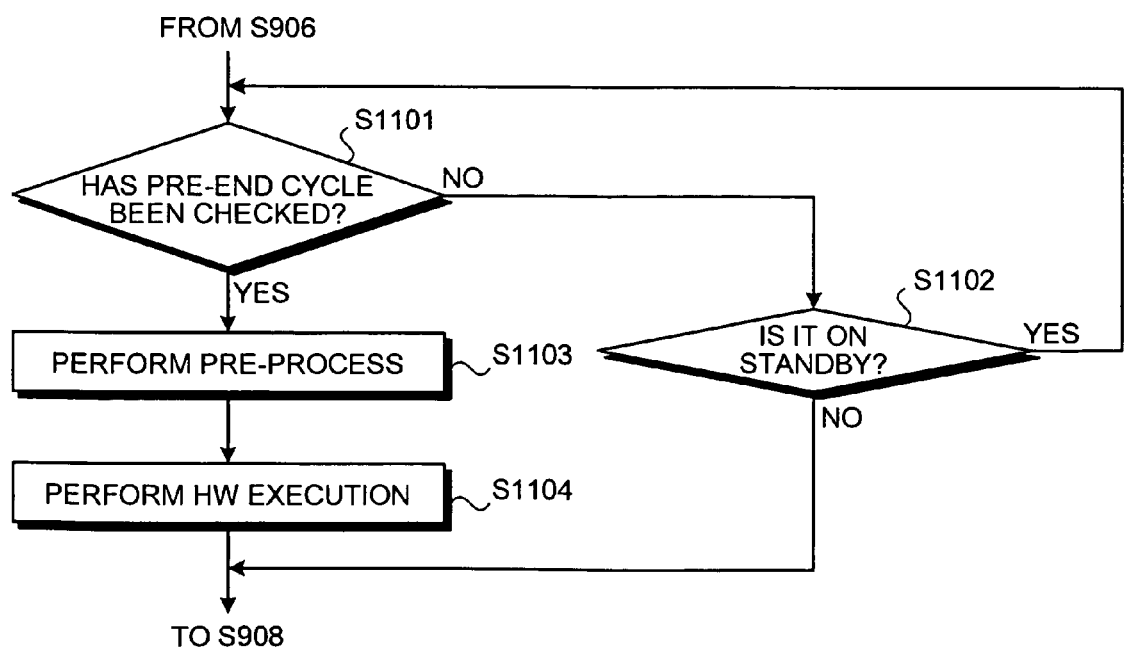
FIG. 13 is a table for illustrating a correlation between a cycle range and an HW execution flag.
FIG. 14 is a flowchart of an HW executing process.

The determination can be made without searching for each cycle by preparing parameters using the values of RegH. v and RegW. v as the HW determination flag for the cycle range because the cycle range of Pre_cycle to check_cycle has been defined. FIG. 13 is a table for illustrating a correlation between the cycle range described above and the HW execution flag.

When it is determined to start the hardware HW0 and HW1 at step S906 (step S906: YES), the HW executing process is executed (step S907). The details of the HW executing process (step S907) will be described later.

After the HW executing process (step S907), a completion determination is executed (step S908). In the completion determination, after the processor core models PE0, PE1 and the pieces of hardware HW0, HW1 are all executed, whether current_cycle is larger than next_base_cycle is determined.

When current_cycle is less than next_base_cycle (step S908: NO), it can be seen that the processor core models PE0 and PE1 are positioned within the cycle term of next_base_cycle to base_cycle (or current_cycle) of FIG. 11, and this means that the processor core models can be executed more. In this case, the process proceeds to step S909.

When current_cycle is more than next_base_cycle (step S908: YES), the cycle term or the delay table can move respectively to the next cycle term of next-base_cycle to base_cycle or the delay tables Ta, Tb, Tc, or Td. In this case, the procedure is returned to step S901.

At step S909, current_cycle is updated. current_cycle (see FIG. 11) is the current absolute number of cycles. Being executed for N steps (=cycles) as a unit, this means the cycle value after N steps of the cycle value currently being simulated.

At step S909, the current cycle number of the simulation is updated. This cycle number is set to a cycle number that is the smaller of the cycle numbers of the processor core models PE0, PE1 of FIG. 11. current_cycle is initialized when the simulation is started, and starts from zero. After step S909, the procedure is returned to step S903.

FIG. 14 is a flowchart of the HW executing process. In FIG. 14, pre-end cycle check is executed first (step S1101).

As shown in the delay table Td of FIG. 11, the process of a hardware HW# (# indicates a digit) that the preceding processor core model PE0 has caused the hardware HW# to execute, and the process of a hardware HW# that the processor core model PE1 has caused this hardware HW# to execute, may overlap with each other. In the pre-end cycle check, in this case, whether the process has ended is checked. To check, verification can be executed by comparing the process end time (cycle) for the previous time and the cycle at the starting up by the processor core model PE1.

When those processes overlap (step S1101: NO), a standby judgment process is executed (step S1102). In the standby judgment process (step S1102), for example, a case where the hardware HW1 can only execute one instruction is assumed.

In this case, when the HW execution can be kept standby (step S1102: YES), the procedure is returned to step S1101. That is, the HW execution can be executed immediately after the end cycle of the pre-process. However, the number of cycles at the starting up is shifted to the number obtained by adding the number of standby cycles thereto and the HW execution is executed again. When the HW execution is cancelled (step S1102: NO), the procedure is moved to step S908 shown in FIG. 12 without executing the HW execution.

When the processes overlap at step S101 (step S1101: Yes), the pre-process is executed (step S1103). In the pre-process, the cycles that are scheduled to end, etc., are stored. Thereafter, the HW execution, that is, the pieces of hardware HW0, HW1 are executed (step 1104).

The cycle simulation method described in the embodiment may be realized by executing a program prepared in advance, on a computer such as a personal computer, a work station, etc. This program is recorded in a computer-readable recording medium such as an HD, an FD, a CD-ROM, an MO, a DVD, etc., and is executed by being read from the recording medium by the computer. This program may be a transmission medium capable of being distributed through a network such as the Internet.

As described above, according to the embodiments of the present invention, it is possible to facilitate reduction of the simulation time and a higher-precision simulation.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A method of simulating a plurality of execution blocks in a large scale integration model in parallel, the method comprising:

simulating a first and a second execution block in parallel;

detecting, when a first instruction is executed by the first block that is selected from among the execution blocks, a number of cycles at a time of completion of the first instruction;

judging whether a second instruction currently being executed by the second block that is selected subsequent to the first block is an instruction to access a memory model;

determining, based on a result of judgment at the judging, whether a first address at which the first block has accessed the memory model coincides with a second address of the memory model, the second address included in the second instruction for the second block to access;

comparing, when the first address coincides with the second address at the determining, a current number of cycles of the second block and the number of cycles detected at the detecting; and storing, based on a result of comparison at the comparing, the second address and data that has been stored at the second address, in a storage area different from the memory model.

2. The method including according to claim 1:

detecting, when the second instruction is executed, a number of cycles at a completion of the second instruction;

judging whether a third instruction currently being executed by the first block that is selected again subsequent to the second block is an instruction to access the memory model;

determining whether the second address coincides with a third address of the memory model, the third address included in the third instruction for the first block to access, based on a result of judgment at the judging whether the third instruction is to access the memory model;

comparing a current number of cycles of the first block and the number of cycles detected at the detecting at the end of completion of the second instruction, based on a result of determination at the determining whether the second address coincides with the third address; and accessing stored address and stored data, based on a result of comparison at the comparing the current number of cycles of the first block and the number of cycles detected at the detecting at the end of completion of the second instruction.

3. A computer-readable recording medium that stores therein a computer program for realizing a method of simulating a plurality of execution blocks in a large scale integration model in parallel, the computer program making a computer execute:

simulating a first and a second execution block in parallel;

detecting, when a first instruction is executed by the first block that is selected from among the execution blocks, a number of cycles at a time of completion of the first instruction;

judging whether a second instruction currently being executed by the second block that is selected subsequent to the first block is an instruction to access a memory model;

determining, based on a result of judgment at the judging, whether a first address at which the first block has accessed the memory model coincides with a second address of the memory model, the second address included in the second instruction for the second block to access;

comparing, when the first address coincides with the second address at the determining, a current number of cycles of the second block and the number of cycles detected at the detecting; and storing, based on a result of comparison at the comparing, the second address and data that has been stored at the second address, in a storage area different from the memory model.

4. The computer-readable recording medium according to claim 3, wherein the computer program further makes the computer execute:

detecting, when the second instruction is executed, a number of cycles at a completion of the second instruction;

judging whether a third instruction currently being executed by the first block that is selected again subsequent to the second block is an instruction to access the memory model;

determining whether the second address coincides with a third address of the memory model, the third address included in the third instruction for the first block to access, based on a result of judgment at the judging whether the third instruction is to access the memory model;

comparing a current number of cycles of the first block and the number of cycles detected at the detecting at the end of completion of the second instruction, based on a result of determination at the determining whether the second address coincides with the third address; and accessing stored address and stored data, based on a result of comparison at the comparing the current number of cycles of the first block and the number of cycles detected at the detecting at the end of completion of the second instruction.

5. A cycle simulator including a processor for simulating a plurality of execution blocks in a large scale integration model in parallel, the cycle simulator comprising:
- a detecting unit configured to detect, when a first instruction is executed by a first block that is selected from among the execution blocks, a number of cycles at a time of completion of the first instruction;
- a judging unit configured to judge whether a second instruction currently being executed by a second block that is selected subsequent to the first block is an instruction to access a memory model;
- a determining unit configured to determine, based on a result of judgment by the judging unit, whether a first address at which the first block has accessed the memory model coincides with a second address of the memory model, the second address included in the second instruction for the second block to access;
- a comparing unit configured to compare, when the first address coincides with the second address at the determining, a current number of cycles of the second block and the number of cycles detected by the detecting unit; and
- a repository configured to store, based on a result of comparison at the comparing, the second address and data that has been stored at the second address, in a storage area different from the memory model.

* * * * *